United States Patent [19]

Heubner

[11] Patent Number: 5,700,067
[45] Date of Patent: Dec. 23, 1997

[54] HYDRAULIC BRAKING SYSTEM, ESPECIALLY FOR MOTOR VEHICLES

[75] Inventor: Wilhelm Heubner, Wohnsitz Am Gries, Germany

[73] Assignee: Fahrzeugtechnik Ebern GmbH, Germany

[21] Appl. No.: 707,886

[22] Filed: Sep. 9, 1996

[30] Foreign Application Priority Data

Sep. 12, 1995 [DE] Germany .............. 19533481.7
May 8, 1996 [DE] Germany .............. 19618489.4

[51] Int. Cl.$^6$ ............... B60T 13/12; F16D 55/224
[52] U.S. Cl. ............... 303/9; 303/122.09; 303/122.12; 303/122.43; 303/9.61; 188/72.5
[58] Field of Search ............... 303/10, 122, 122.01, 303/122.09, 122.12, 122.13, 113.1, 113.2, 116.1, 116.2, 119.1, 119.2, 901, 9, 9.61; 188/72.5, 106 P, 73.1, 73.2, 345

[56] References Cited

U.S. PATENT DOCUMENTS

| | | | |
|---|---|---|---|
| 4,726,549 | 2/1988 | Dittner et al. | |
| 4,804,236 | 2/1989 | Burgdorf et al. | 303/116.1 |
| 4,900,101 | 2/1990 | Becker et al. | 303/114.3 |
| 5,168,963 | 12/1992 | Poncini | 303/9 X |

FOREIGN PATENT DOCUMENTS

| | | |
|---|---|---|
| 0 169 178 A2 | 1/1986 | European Pat. Off. . |
| 0 265 623 A2 | 5/1988 | European Pat. Off. . |
| 1 037 287 | 2/1959 | Germany . |
| 1 134 904 | 8/1962 | Germany . |
| 1 180 259 | 8/1965 | Germany . |
| 24 50 874 A1 | 5/1975 | Germany . |
| 35 38 330 A1 | 4/1987 | Germany . |
| 29 33 085 C2 | 12/1987 | Germany . |
| 36 26 292 A1 | 2/1988 | Germany . |
| 36 27 809 A1 | 2/1988 | Germany . |
| 36 38 510 A1 | 5/1988 | Germany . |
| 36 03 074 C2 | 7/1988 | Germany . |
| 37 02 573 A1 | 8/1988 | Germany . |
| 37 05 311 A1 | 9/1988 | Germany . |
| 37 440 70 A1 | 7/1989 | Germany . |
| 39 05 044 A1 | 8/1990 | Germany . |
| 43 22 292 A1 | 1/1995 | Germany . |
| 43 44 580 A1 | 6/1995 | Germany . |
| 1 468 014 | 3/1977 | United Kingdom . |
| 2057 080 | 3/1981 | United Kingdom . |
| 2 201 208 | 8/1988 | United Kingdom . |
| 2 214 250 | 8/1989 | United Kingdom . |

OTHER PUBLICATIONS

European Search Reports, dated Nov. 5, 1996 and Jan. 13, 1997.

Primary Examiner—Josie Ballato
Attorney, Agent, or Firm—McAndrews, Held & Malloy, Ltd.

[57] ABSTRACT

A braking system is disclosed that has a manually-actuatable master cylinder having two pressure chambers. A first pressure chamber hydraulically controls a flow control valve through which the pressure medium flows during servo-braking in order to adjust its regulating cross-section to produce a defined dynamic pressure that is applied to a first piston/cylinder arrangement, connected to the flow control valve, of a brake application element to produce a braking force. A second pressure chamber can be connected to a second piston of a brake application element so that a braking force can be applied to the brake application element if the servo-force fails. Also, instead of the second piston/cylinder arrangement, a separate separator piston/cylinder arrangement can be provided that is inserted between the second pressure chamber and the piston/cylinder arrangement. As a result, sufficient braking force is produced both in servo-force braking and if the servo-force fails. Also, an appropriate response by the braking forces to the master cylinder is effected so that there is always good actuating feedback.

5 Claims, 8 Drawing Sheets

HYDRAULIC BRAKING SYSTEM, ESPECIALLY FOR MOTOR VEHICLES

BACKGROUND OF THE INVENTION

1. Field of the Invention

The present invention relates generally to a hydraulic braking system. The invention is especially a hydraulic power-assisted or power braking system for motor vehicles in which the servo force on the brake application element is applied by dynamic pressure produced when a pressure medium flows through a control valve, said dynamic pressure being able to be adjusted in a defined manner by controlling the control valve using an actuating device.

2. Description of the Related Art

Today, hydraulic braking systems for motor vehicles are conventionally designed as power-assisted or power braking systems. In a power-assisted braking system, the energy required to produce the braking force derives from the physical force of the vehicle driver and from one or more energy supply devices, i.e., during the braking process, some portion of the braking force is applied directly to the brake application element through a master cylinder connected to a manually-actuatable brake pedal, while the rest of the braking force is applied as servo-force (from a hydraulic pump, for example). In contrast, in a power braking system, the energy required to produce the braking force derives from one or more energy supply devices, with the exception of the physical force of the vehicle drive; in other words, the master cylinder connected to the brake pedal does not apply the braking force directly to the brake application element, but rather it controls the servo-force acting on the brake application element.

A servo-brake for a power braking system is known from DE-AS 1 134 904; in it the servo-force is produced by a pressure circulating system. In addition, connected at the output of a hydraulic pump, the servo-brake has a pressure chamber connected to the brake application element and an overflow chamber attached to a reservoir, said overflow chamber being connected to the pressure chamber by a flow control valve. The flow control valve has a valve regulator body that together with a bushing fixed in the power braking system defines the valve passage area of the flow control valve and is connected to the brake pedal, so that the valve passage area of the flow control valve can be adjusted depending on the position of said brake pedal in order to produce dynamic pressure in the pressure chamber that is proportionate to the travel of the brake pedal. This dynamic pressure is forwarded to the brake application elements through a piston in the pressure chamber. The piston has a flow-through opening.

If the hydraulic pump fails, it is possible to produce the required residual braking force by mechanically controlling the brake circuit. An additional valve element is provided for this purpose that can be applied with the valve regulator body, if the valve regulator body is pushed far enough into the bushing so that the flow control valve is closed. The additional valve element can now be displaced through the valve regulator body against the force of a restoring spring in the direction of the piston in the pressure chamber in order to close the flow-through opening in the piston so that the brake application elements can be controlled by the piston.

This is disadvantageous in that integration of the residual braking function into the servo-brake is relatively difficult to achieve in accordance with this state of the art, given the high number of components and large dimensions. Furthermore, there is the problem that if the servo-force fails, the relatively large stroke of the flow control valve has to be travelled in order to control the brake circuit to produce the required residual braking force, so that if the servo-force fails, the brake actuates unusually late, which can lead to dangerous situations.

These types of servo-brakes that work with a flow control valve in accordance with the principle of dynamic pressure are also known for power-assisted braking systems in accordance with DE-PS 1 180 259. The servo-brake disclosed in DE-PS 1 180 259 essentially differs from the servo-brake described above in that the piston in the pressure chamber is actuated by the valve regulator body connected to the brake pedal, even during normal braking, while instead of the additional valve element, a non-return valve is attached in the flow-through opening of the piston. The non-return valve is pre-stressed in its closed position against the actuating direction of the valve regulator body and unblocking the path for the pressure medium only in the direction of the brake application element.

Furthermore, an additional pressure area containing an additional piston is provided. The area is attached between the valve regulator body of the flow control valve and the piston in the pressure chamber in order to apply to the valve regulator body, and therefore to the brake pedal, a reaction force proportionate to the dynamic pressure. This response of the dynamic pressure against the flow control valve to the brake pedal is required in order to enable responsive actuation of the brake pedal that reflects the braking pressure in each of the brake application elements.

In this system, regardless of whether immediate brake response is provided by direct mechanical action on the piston in the pressure chamber, even if the servo-force fails, it can be considered a disadvantage of this servo-brake that during the selected direct mechanical action on the piston, the response of the dynamic pressure against the flow control valve to the brake pedal requires relatively great expense in terms of technical devices. In other words, it requires a large number of components and a great deal of room for the valve. In addition, when the brake pedal is actuated, the mass of the additional piston has to be moved, as well, and the frictional force between the additional piston and the interior wall of the additional pressure area has to be overcome, which further increases the actuating force required to produce the necessary residual braking force on the brake pedal in the event that the servo-force fails.

Furthermore, DE-PS 1 037 287 illustrates a servo-brake for a power brake system in which the brake circuit is separate from the servo-circuit. This system also works with a flow control valve using the principle of dynamic pressure. Extending through the overflow chamber is a valve regulator body, one end of which can be hydraulically controlled by the master cylinder, which is connected to the brake pedal. The other end projects into the pressure chamber of the servo-circuit. The valve regulator body is provided a center-drilled pocket on the end that projects into the pressure chamber of the servo-circuit; there is a cross-hole at the base of the pocket that connects the pressure chamber of the servo-circuit to the overflow chamber. The flow control valve is formed by the end of the valve regulator body that projects into the pressure chamber of the servo-circuit and the base of a plunger piston positioned concentric with the valve regulator body. The plunger piston extends sealed through a separating wall between the pressure chamber of the servo-circuit and the pressure chamber of the brake circuit.

Although this system has the advantage that, by separating the servo-circuit from the brake circuit, a servo-source having, for example, a different operating medium for the servo-circuit already present in the vehicle can be used, there are still problems in terms of the path-dependant control of the valve passage area of the flow control valve. On the one hand, the effective hydraulic area of the valve regulator body on the master cylinder side is too small to produce hydraulically the required residual braking force through the master cylinder with proportionate actuating force on the brake pedal if the servo-force fails. On the other hand, the effective hydraulic area of the valve regulator body on the master cylinder side is so large that during normal braking it requires a great deal of pressure medium or a lengthy stroke at the master cylinder with correspondingly higher actuating force on the brake pedal to adjust the valve passage area of the flow control valve and thereby to adjust the servo-force. In addition, during normal braking, the regulating process adjustment that occurs when the valve regulator body is displaced by pressure through the master cylinder on the plunger piston at the valve passage area of the flow control valve leads to a situation in which the brake pedal subjected to the actuating force gives way, which is characterized as the brake pedal "running away." As a result, it can be stated that both during normal braking, with servo-support, and when the servo-force of the brake pressure affecting brake application elements fails, there is not sufficient sensitivity in the brake pedal, so that actuation and pedal response are not good.

Furthermore, known from DE 39 05 044 A1 or DE 43 22 292 A1, for example, are pressure modulators for power-assisted or power braking systems, by means of which the pressure of a hydraulic pump can be regulated in accordance with the principle of reaction pressure in order to produce a servo-force proportionate to actuating force. Such a pressure modulator is inserted into the servo-circuit of the braking system and has a valve housing in which a sliding valve piston is arranged. One side of said valve piston borders a control chamber that is hydraulically connected to the master cylinder attached to brake pedal, while the other side of said valve piston borders a pressure chamber. The pressure chamber is connected to a hydraulic pump by a pressure line and has an outlet that is connected to a reservoir and that can be closed using a seat on the valve piston. The pressure line connecting the pressure chamber to the hydraulic pump has a branch that is connected hydraulically to the brake application elements (in the case of DE 39 05 044 A1) or that leads to a servo-brake (in the case of DE 43 22 292 A1).

When operating a braking system of this design, actuation of the brake pedal produces pressure in the control chamber of the pressure modulator; the pressure pushes the valve piston so that the seat of the valve piston closes the pressure chamber outlet. As a consequence, pressure builds up at the hydraulic pump outlet, this pressure also acting on the brake application elements, i.e., in the servo-brake, through the branch. As soon as the pressure at the hydraulic pump outlet (and thereby in the pressure chamber of the pressure modulator) is equal to the pressure in the control chamber, the valve piston is pressed back from the pressure chamber outlet so that excess pressure medium is fed into the reservoir. A regulating process is initiated that determines the pressure at the hydraulic pump outlet depending on the pressure in the control chamber.

One disadvantage of these systems is that, in the case of DE 39 05 044 A1, regulating the servo-pressure using the pressure modulator by pushing the valve piston away from the pressure chamber outlet while decreasing the volume of the control chamber affects the master cylinder so that regulating pressure surges can be detected on the brake pedal as a result of the regulating pressure. Also, in the case of DE 43 22 292 A1, the absence of retroactive effects resulting from the regulating process in the pressure modulator can only be provided at great expense in terms of technical devices and using a liquid chamber in the servo-brake and additional valves.

Finally, use of electro-magnetically controlled ball check valves in pressure modulators for hydraulic anti-lock braking systems (ABS) is known in principle from DE 36 03 074 C2 and DE 37 02 573 A1. In these pressure modulators, the ball check valve functions as an on/off valve, the ball valve of which can be pushed indirectly by an electro-magnetically adjustable pressure release piston of the pressure modulator or directly by its own electro magnets, provided for this purpose, in order to interrupt the connection between the master cylinder and the wheel brake cylinder. This means that during ABS operation, braking pressure in the wheel brake cylinder can be regulated by the pressure relief piston regardless of the pressure in the master cylinder.

To summarize, it can be stated that the known power-assisted and power braking systems in which the servo-force is produced by a hydraulic pump in accordance with the principles of dynamic and reaction pressure are in need of improvement in terms of satisfactory response to the brake pedal from the braking pressure occurring in the brake application elements, appropriate actuation force requirement on the brake pedal when there is sufficient braking force on the brake application elements, and regulation processes in the servo-circuit with no retroactive effects.

SUMMARY OF THE INVENTION

Therefore, with respect to the state of the art described above, the present invention is based on the object of providing a simply-constructed, hydraulic power-assisted or power braking system to produce sufficient braking force on the brake application elements, along with good pedal responsiveness, during normal braking, even if the servo-force has failed. This object is achieved by a hydraulic braking system, especially for motor vehicles, including an actuating device and a master cylinder connected to the actuating device. The master cylinder includes a first pressure chamber and a second pressure chamber. The system has a flow control valve, through which flows a pressure medium during the servo-force braking, hydraulically connected to the first pressure chamber so that the first pressure chamber hydraulically controls the flow control valve by adjusting its regulating cross-section to produce a defined dynamic pressure. The system also includes a brake application element constructed and arranged to produce a braking force. The brake application element includes a first piston/cylinder arrangement and a second piston/cylinder arrangement. The first piston/cylinder arrangement is hydraulically connected to the flow control valve and is responsive to the defined dynamic pressure received from the flow control valve. The second piston/cylinder arrangement is hydraulically connected to the second pressure chamber to produce a braking force to the brake application element if the servo-force braking fails.

In accordance with an embodiment of the present invention, a hydraulic braking system is provided. The system includes a master cylinder connected to an actuating device. The master cylinder has two pressure chambers. Of the two pressur controls, the first hydraulically controls a flow control valve during servo-force braking in order to adjust its regulating cross-section to produce a defined dynamic pressure that is applied to a first piston/cylinder arrangement, hydraulically connected to the flow control valve, of a brake application element to produce a braking force. The second pressure chamber of the master cylinder can be hydraulically connected to a second piston/cylinder arrangement of a brake application element so that a braking force can be applied to the brake application element if the servo-force fails.

In accordance with another embodiment of the present invention, a hydraulic braking system having a master cylinder attached to an actuating device, wherein the master cylinder has two pressure chambers is provided. The first pressure chamber hydraulically controls a flow control valve through which flows a pressure medium during servo-force braking in order to adjust its regulating cross-section to produce a defined dynamic pressure that, in order to produce a braking force, is applied hydraulically in servo-force braking to a piston/cylinder arrangement of a brake application element that is connected to the flow control valve which is connected hydraulically to a servo-pressure chamber of a separator piston/cylinder arrangement. The second pressure chamber of the master cylinder can be hydraulically connected to the actuating pressure chamber, separated from the servo-pressure chamber by a separator piston, of a separator piston/cylinder arrangement, so that a braking force can be applied to the brake application element through the separator piston if the servo-force fails.

The invention provides functional separation of the servo-circuit from the manually adjustable brake circuit by two separate piston/cylinder arrangements in the brake application element and the combination of one piston/cylinder arrangement in the brake application element and an additional or separate separator piston/cylinder arrangement, as well as hydraulic control of the flow control valve to produce the dynamic pressure when a flow is forced through the regulating cross-section produces sufficient braking force on the brake application element and a proportionate response from the braking forces to the actuating device, both during servo-force braking and if the servo-force has failed, so that there is always good actuating or pedal responsiveness.

The hydraulic braking systems designed in accordance with the invention as described above have in particular the advantage of great flexibility in terms of space. In other words, the individual components (like the flow control valve, the hydraulic pump, and the separator piston/cylinder arrangement) are not tied to a specific position in the vehicle (e.g., the brake pedal), but rather can also be arranged at another location in the vehicle where space is more readily available or for convenience.

In addition, additional components can be easily integrated into the functionally-divided hydraulic braking system to satisfy additional functions (like anti-lock braking systems, traction control (ASR), and vehicle dynamics regulation system). Finally, the expense of technical devices decreases significantly compared to the known art described earlier because the individual components that satisfy only a few functions can be designed more simply as a result of the functional separation addressed above.

The second described embodiment of the hydraulic braking system is especially suitable for converting existing braking systems, since conventional single-chamber brake calipers and wheel brake cylinders can be controlled hydraulically by drum brakes. In addition, duplicate brake lines need not be laid for every caliper, so that the design of this braking system is particularly simple in terms of technical devices. Finally, a switch from servo-force braking operations to power-assisted or emergency operation of the braking system by the separator piston/cylinder arrangement, depending on the effective hydraulic areas at the separator piston, and by the movement of the separator piston can be automatically and advantageously recognized (e.g., by a direction switch) and reported to the driver.

In an embodiment of this invention, a brake application element is created that is particularly adapted to the first described embodiment of the hydraulic braking system wherein the brake application element has two piston/cylinder arrangements. Because of the advantageous concentric arrangement of the two piston/cylinder arrangements, the brake application element is no larger than a conventional brake caliper.

The features of the embodiments of this invention create a modular design that permits simple expansion of the hydraulic braking system to ABS, ASR, and/or a vehicle dynamics control system, wherein the additional regulation (in the case of ABS) can essentially be conducted with no retroactive effects so that good pedal responsiveness is still provided. In particular, the hydraulic braking system having ABS is designed advantageously because there is no need to provide a relief valve to functionally separate the manually-controlled brake circuit from the power brake circuit when the anti-lock braking system is in operation. On the contrary, this function is satisfied by the separator piston/cylinder arrangement in the circuit as given.

Advantageous embodiments of the separator piston/cylinder arrangement are also provided. For example, an embodiment of the separator piston/cylinder arrangement has a sensor for sensing the separator piston movement, which makes it easy to determine whether the hydraulic braking system is switched to emergency operation. The signal emitted by the sensor can then, for example, be used to display the operating mode of the hydraulic braking system.

In accordance with another embodiment, the flow control valve is designed advantageously as a ball check valve, so that the regulating cross-section can be adjusted reliably and precisely to produce a defined dynamic pressure. Furthermore, the use of a ball check valve is cost-effective.

The present invention is explained in more detail in the following, using preferred embodiment examples and referring to the drawing, identical or similar parts having identical numerical labels.

DETAILED DESCRIPTION OF THE PREFERRED EMBODIMENTS

Figure 1:
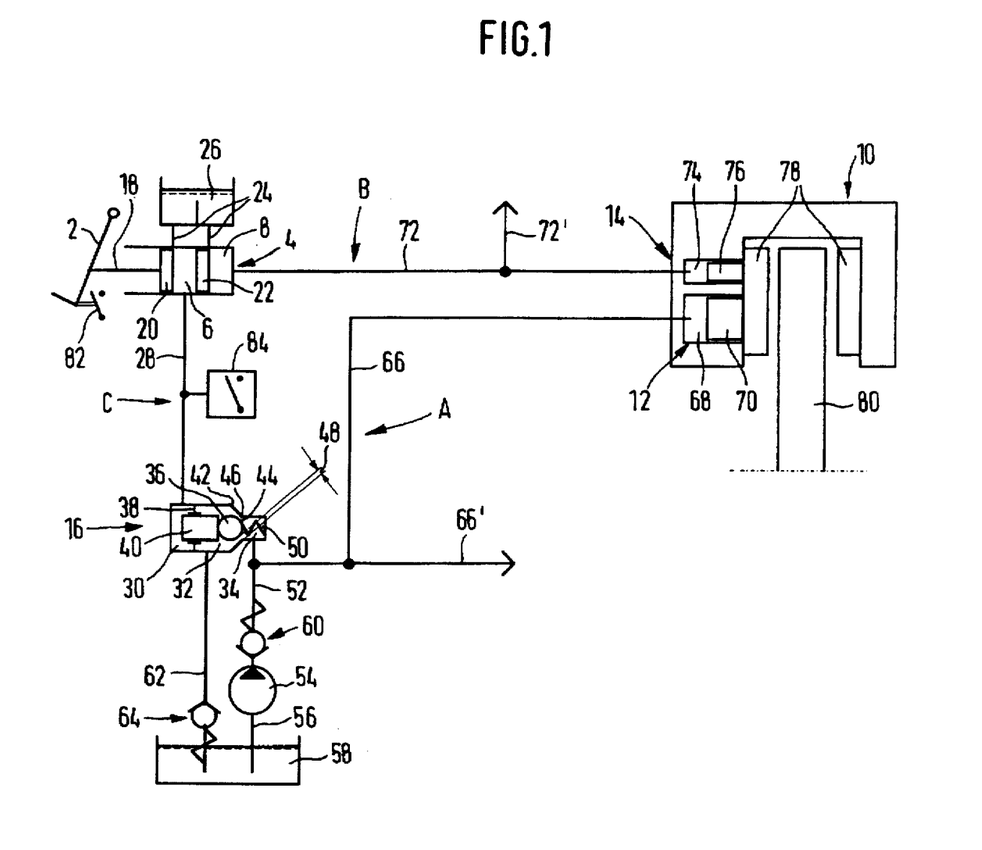
FIG. 1 is a principal illustration of a first embodiment example of the braking system in accordance with the invention, designed as a power-assisted braking system, having parallel arrangement of two piston/cylinder arrangements in the brake caliper.

In accordance with FIG. 1, an embodiment of a hydraulic power-assisted braking system of the present invention has a brake pedal 2 serving as an actuating device and connected to a master cylinder 4 (e.g., a tandem main cylinder) that has two pressure chambers 6, 8. Also provided is a brake caliper 10 acting as a brake application element that is provided with two piston/cylinder arrangements 12, 14. The first pressure chamber 6 of the master cylinder 4 acts as the hydraulic control of a flow control valve 16 in which a pressure medium is forced to flow during servo-supported braking and which is hydraulically connected to the first piston/cylinder arrangement 12 of the brake caliper 10. The regulating cross-section of the flow control valve 16 is hydraulically adjusted by the first pressure chamber 6 of the master cylinder 4 to produce a defined dynamic pressure that acts on the first piston/cylinder arrangement 12 of the brake caliper 10 to produce a braking force. The second pressure chamber 8 of the master cylinder 4 is connected to the second piston/cylinder arrangement 14 of the brake caliper 10 so that a braking force can be produced on the brake caliper 10 if the servo-support fails.

A piston rod 18 connects the brake pedal 2 to the first piston 20 of the master cylinder 4 which hydraulically defines the first pressure chamber 6 on the brake pedal side. Between the first pressure chamber 6 and the second pressure chamber 8 is a second piston 22 that hydraulically separates the first and second pressure chambers 6, 8 from each other. The first and second pressure chambers 6, 8 are each connected to a balance tank 26 by a port 24. The first pressure chamber 6 of the master cylinder 4 is connected by a control line 28 to a control chamber 30 of the flow control valve 16, which is designed as a three-chamber 2/2 ball check valve having hydraulic control that has an overflow chamber 32 and a pressure chamber 34 in addition to the control chamber 30. Arranged in the overflow chamber 32 is a valve regulator body 36 in the form of a metal ball that can be mechanically actuated by a force from a control piston 40 that extends sealed through a wall 38 between the control chamber 30 and the overflow chamber 32 and that can be moved axially. The valve regulator body 36 can only be actuated by the force of pressure from the control piston 40, since the valve regulator body 36 and the control piston 40 are two separate components. Provided in a wall 42 between the overflow chamber 32 and the pressure chamber 34 is a through hole 44 that hydraulically connects the overflow chamber 32 and the pressure chamber 34 to each other. Attached at the overflow chamber side of the through hole 44 is a ring-shaped sealing seat 46; together with the valve regulator body 36 it defines a valve passage area 48, the flow-through cross-section of which corresponds to the regulating cross-section of the flow control valve 16. Attached in the pressure chamber 34 is a restoring spring 50 that extends through the through hole 44 and presses the valve regulator body 36 against the control piston 40. If there is no control pressure in the control chamber 30, the control piston 40 is held in its starting position by the restoring spring 50 through the valve regulator body 36, the valve passage area 48 being opened to its maximum (through-null position of the flow control valve 16).

The pressure chamber 34 of the flow control valve 16 is connected hydraulically by a pressure line 52 to the output of a hydraulic pump 54, the inlet of which is connected to a reservoir 58 for the pressure medium, preferably brake fluid, by an inlet line 56. A non-return vane 60 inserted into the pressure line 52 is pre-stressed in the direction of the hydraulic pump 54. The overflow chamber 32 of the flow control valve 16 is connected to the reservoir 58 by a return line 62. A pressure maintenance valve 64 inserted into the return line 62 is pre-stressed in the direction of the overflow chamber 32.

Branching off from the pressure line 52 between the non-return valve 60 and the pressure chamber 34 of the flow control valve 16 is a pressure line 66 that is connected to the pressure chamber 68 of the first piston/cylinder arrangement 12 of the brake caliper 10 so that the piston 70 of the first piston/cylinder arrangement 12 can be acted upon by the dynamic pressure produced by the hydraulic pump 54 and controlled by the flow control valve 16.

The second pressure chamber 8 of the master cylinder 4 is attached directly to the pressure chamber 74 of the second piston/cylinder arrangement 14 of the brake caliper 10 by a pressure line 72 so that the piston 76 of the second piston/cylinder arrangement 14 can be acted upon by the pressure produced in the second pressure chamber 8 by the second piston 22 of the master cylinder 4 as a result of downward pressure on the brake pedal 2.

The brake caliper 10 (a floating caliper in the illustration) is provided with brake linings 78 that are pressed against a brake disk 80 by the piston 70 of the first piston/cylinder arrangement 12 or by the piston 76 of the second piston/cylinder arrangement 14 in a known manner when pressure acts upon the first/second piston/cylinder arrangement 12, 14. In the illustration, the first and second pressure/cylinder arrangements 12, 14 are arranged next to or parallel to each other, but they can also be arranged concentrically or on opposing sides of the brake disk 80 of the brake caliper 10, for example.

Finally, a pedal switch 82 that can be mechanically actuated by the brake pedal 2 and/or an electro-hydraulic manometric switch 84 inserted into the control line 28 is/are provided; the function of these will be explained in the following.

As a result, the hydraulic pump 54, the pressure line 52, the flow control valve 16 connected to the reservoir 58 by the return line 62, the pressure line 66, and the first piston/ cylinder arrangement 12 of the brake caliper 10 form a power brake circuit A that is controlled by a hydraulically-separate control circuit C comprising the piston 20 of the master cylinder 4, the first pressure chamber 6 of the master cylinder 4, the control line 28, the control chamber 30 of the flow control valve 16, and the control piston 40 of the flow control valve 16. The second piston 22 of the master cylinder 4, the second pressure chamber 8 of the master cylinder 4, the pressure line 72, and the second piston/cylinder arrangement 14 of the brake caliper 10 form a brake circuit that is independent from power brake circuit A and that can be controlled manually by the brake pedal 2.

At this point, it should be remarked that, for the sake of simplicity, FIG. 1 merely illustrates a basic embodiment of the power-assisted braking system having a brake caliper 10 for a wheel. The piston/cylinder arrangements of additional brake calipers are attached to the first piston/cylinder arrangement 12 in the brake caliper 10 by the branch 66' from the pressure line 66, which connects the pressure line 52 between hydraulic pump 54 and pressure chamber 34 of the flow control valve 16, or by the branch 72' from the pressure line 72 between second pressure chamber 8 of the master cylinder 4 and second piston/cylinder arrangement 14 of the brake caliper 10, as appropriate. Thus, on a four-wheel motor vehicle it is conceivable that only two of four brake calipers are each provided with two piston/cylinder arrangements that are acted upon by power brake circuit A or brake circuit B as described above, while the other two brake calipers each have only one piston/cylinder arrangement that is acted upon by power brake circuit A. Other combinations are also possible, commensurate with the requirements of each situation. This also applies to the embodiment examples illustrated in FIGS. 3 and 4.

The functioning of the first embodiment example is described in the following. Downward pressure on the brake pedal 2 pushes the pistons 20, 22 of the master cylinder 4 in the pressure chambers 6, 8 in FIG. 1 to the right and closes the ports 24 to the balance tank 26 so that pressure in the pressure chambers 6, 8 is proportional to the actuating force on the brake pedal 2. This pressure now appears as control pressure in control circuit C for power brake circuit A through the control line 28 in the control chamber 30 of the flow control valve 16. In brake circuit B, this pressure is applied through the pressure line 72 in the pressure chamber 74 of the second piston/cylinder arrangement 14 of the brake caliper 10.

In control circuit C, control pressure in the control chamber 30 of the flow control valve 16 pushes the control piston 40 in FIG. 1 to the right and thereby presses the valve regulator body 36, which is adjacent to the control piston 40 because of the force of the restoring spring 50, in the direction of the sealing seat 46. At the same time, the hydraulic pump 54 is started either by the pedal switch 82 activated by the brake pedal 2, or, if a pre-determined signal pressure in control circuit C is exceeded, by the electrohydraulic manometric switch 84, for which the pedal switch 82 or the electro-hydraulic manometric switch 84 delivers an electric signal that starts an electro-motor (not shown) drive-connected to the hydraulic pump 54 or that engages an electro-magnetic coupling (not shown) that connects the hydraulic pump 54 to a rotating shaft of the motor or wheel of the motor vehicle. The hydraulic pump 54 could also however be operated throughout the entire duration of vehicle usage.

Now the hydraulic pump 54 draws the pressure medium out of the reservoir 58 through the inlet line 56 and conveys it through the non-return valve 60 and the pressure line 52 into the pressure chamber 34 of the flow control valve 16.

The pressure medium flows from the pressure chamber 34 through the valve passage area 48 into the overflow chamber 32 and from there through the return line 62 and the pressure maintenance valve 64 back into the reservoir 58. Since when the brake pedal 2 is first actuated the control piston 40 of the flow control valve 16 and therefore the valve regulator body 36 are only pushed slightly in the direction of the sealing seat 46 so that the valve passage area 48 is almost completely open, the hydraulic pump 54 circulates the pressure medium through the flow control valve 16 with essentially no pressure.

The valve regulator body 36 is now pushed against the force of the restoring spring 50 further in the direction of the sealing seat 46 by the hydraulically-actuated control piston 40, and it is pushed with a force equal to the product of the control pressure produced in the control chamber 30 by the master cylinder 4 and the effective hydraulic area of the control piston 40. As the valve regulator body 36 approaches the sealing seat 46, the valve passage area 48 decreases, which decreases the flow-through cross-section for the pressure medium circulated by the hydraulic pump 54 through the pressure line 52 and the pressure chamber 34. As a result, dynamic pressure, produced in power brake circuit A in the circulating direction of the pressure medium in front of the valve passage area 48, transmits through the pressure chamber 34, the pressure line 52, and the pressure line 66 up to the pressure chamber 68 of the first piston/cylinder arrangement 12 of the brake caliper 10, so that a braking force is applied to the brake disk 80 by the piston 70 of the first piston/cylinder arrangement 12 and by the brake lining 78.

The dynamic pressure produced in front of the valve passage area 48 essentially depends on the volume flow rate of the hydraulic pump 54 and the flow-through resistance of the flow control valve 16, but can be accurately estimated as proportional to the dynamic pressure occurring in the control chamber 30 of the flow control valve 16. The proportionality factor between this control pressure and the dynamic pressure produced in front of the valve passage area 48 is determined by the ratio of the effective hydraulic area of the control piston 40 in the control chamber 30 to the effective hydraulic area of the valve regulator body 36 at the sealing seat 46. Appropriate dimensioning of these effective areas on the one hand permits the desired pressure intensification in power brake circuit A to be adjusted. On the other hand, the reaction force applied through the effective hydraulic area of the valve regulator body 36 can be adjusted by the dynamic pressure at the valve regulator body 36 in such a way that a proportionate response from the dynamic pressure to the brake pedal 2 results through the pressure columns of control circuit C between the control piston 40 of the flow control valve 16 and the first piston 20 of the master cylinder 4 in order to provide good pedal responsiveness and thereby to enable responsive actuation of the brake pedal 2. Since the valve passage area 48 of the flow control valve 16 is continuously moved and is not completely closed against the dynamic pressure during servo-supported braking, no regulating pressure surges occur that could retroactively affect the brake pedal 2.

As described above, the pressure produced in brake circuit B in the second pressure chamber 8 of the master cylinder 4 by pressing the brake pedal 2 downward occurs simultaneously in the pressure chamber 74 of the second piston/cylinder arrangement 14 of the brake caliper 10. This pressure thereby likewise produces a braking force on the brake disk 80 by the piston 76 of the second piston/cylinder arrangement 14 and by the brake lining 78. The reaction force produced on the piston 76 of the second piston/ cylinder arrangement 14 is reported back through the pressure column between the piston 76 and the second piston 22 of the main cylinder 4 and through the pressure column between the second piston 22 and the first piston 20 of the master cylinder 4, and combined with the reaction force in control circuit C, to the brake pedal 2 and enable responsive actuation of the brake pedal 2 that reflects the actual braking pressure in the brake caliper 10.

From the above description it becomes clear that if, for instance, the hydraulic pump 54 or fails or if there is a leak in power brake circuit A, the required residual braking force can be applied to the brake disk 80 manually with proportionate response to the brake pedal 2 through brake circuit B, which has been functionally uncoupled from brake circuit A.

If the braking pressure is now to be reduced in servo-supported braking operations, releasing the brake pedal 2 decreases the control pressure in control circuit C and the control piston 40 of the flow control valve 16 and the valve regulator body 36 return to their original position while the valve passage area 48 enlarges, whereby it is subjected against the decreasing control pressure in the control chamber 30 through the valve regulator body 36 by the dynamic pressure, decreasing as a consequence of the enlargement of the valve passage area 48, of the circulating pressure medium in the pressure chamber 34 and the force of the restoring spring 50. If the pre-determined signal pressure in control circuit C at the electro-hydraulic manometric switch 84 is not exceeded, the hydraulic pump 54 and its drive are switched off and circulation of the pressure medium ends. In brake circuit B, the braking pressure in the pressure chamber 74 of the second piston/cylinder arrangement 14 also naturally of the brake pedal 2 decreases as a result being released.

Figure 2:
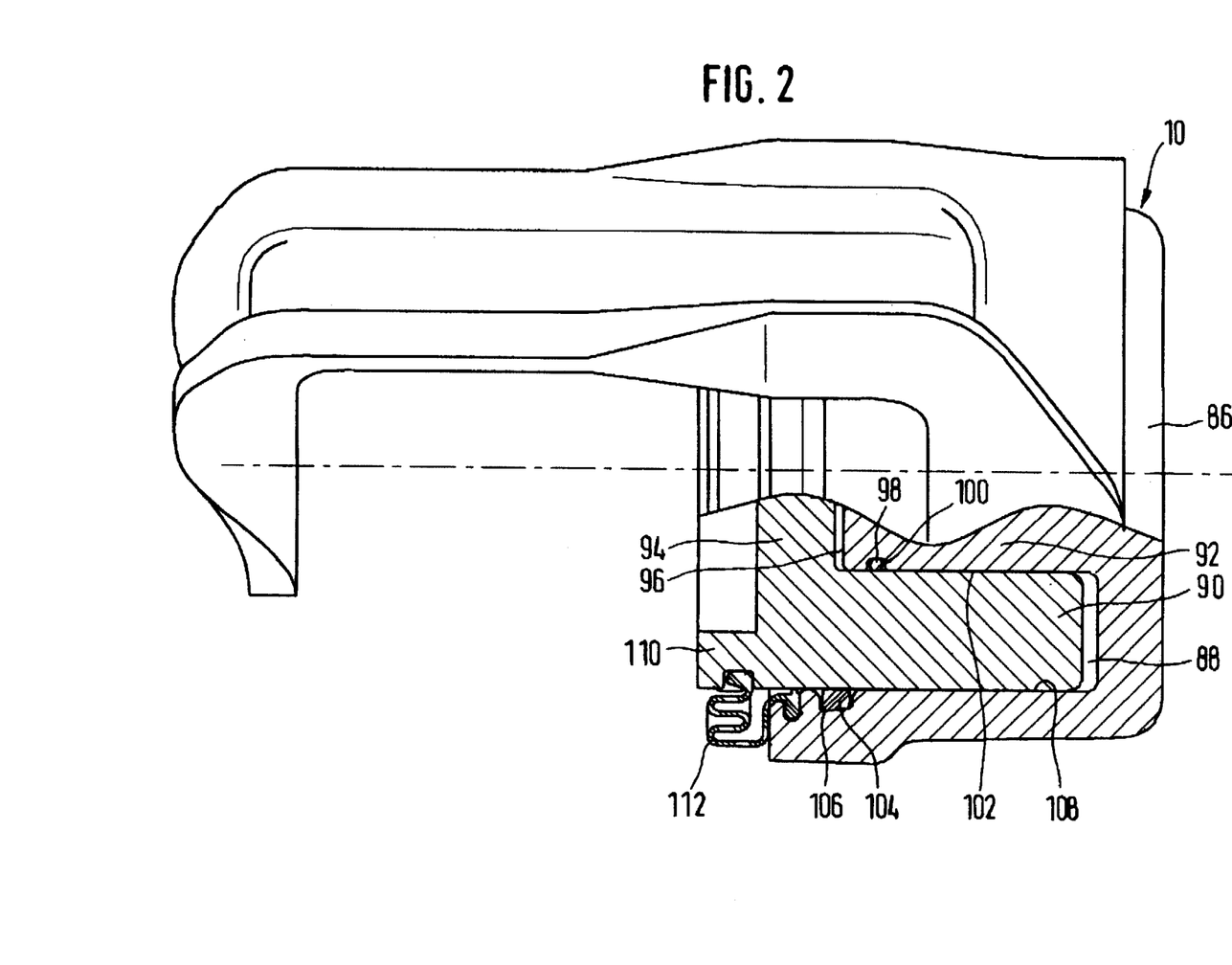
FIG. 2 is a partial sectional view of a preferred brake caliper for the braking system in accordance with FIG. 1, having a cylindrical piston that forms both the piston of the one piston/cylinder arrangement and the cylinder of the other piston/cylinder arrangement.

FIG. 2 illustrates a brake caliper 10 for the braking system having the preferred design of the two piston/cylinder arrangements 12, 14, which can also be used in the first through third embodiment examples.

In accordance with FIG. 2, designed in a housing 86 of the brake caliper 10 is an annular chamber 88 that includes a slidable pot-shaped annular piston 90. The annular piston 90 is adjacent to a cylindrical pivot 92 of the housing 86, which with the base 94 of the annular piston 90 forms a cylindrical chamber 96. Both the annular chamber 88 and the cylindrical chamber 96 are provided with a connection (not shown) so that they can be attached to the pressure line 66 of power brake circuit A or to the pressure line 72 of brake circuit B.

The cylindrical chamber 96 is hydraulically sealed against the annular chamber 88 by means of a sealing element 98 that is contained in a channel 100 in the exterior circumferential surface 102 of the pivot 92, but that could also be fixed to the interior surface of the annular piston 90. The annular chamber 88 is sealed by a sealing element 104 that is contained in a channel 106 in the interior circumferential surface 108 of the housing.

The annular piston 90 is connected at its end section 110 projecting out of the housing 86 to the housing 86 by an elastic collar 112 that prevents brake dust from penetrating between the exterior circumference of the annular piston 90 and the interior circumferential 108 of the housing. The annular piston 90 works through its end section 110 with the brake linings (not shown) in a manner known in and of itself to apply a braking force to a brake disk (not shown).

As a result, the housing 86 together with the annular piston 90 forms the first and second piston/cylinder arrangement 12, 14 of the brake caliper 10 in a very compact construction so that the two-chamber brake caliper 10 does not require more space than a conventional single chamber brake caliper. Depending on the design of the power-assisted braking system, either the annular chamber 88 or the cylindrical chamber 96 is connected to power brake circuit A by the pressure line 66, while each of the other chambers is attached to brake circuit B by the pressure line 72.

Figure 3:
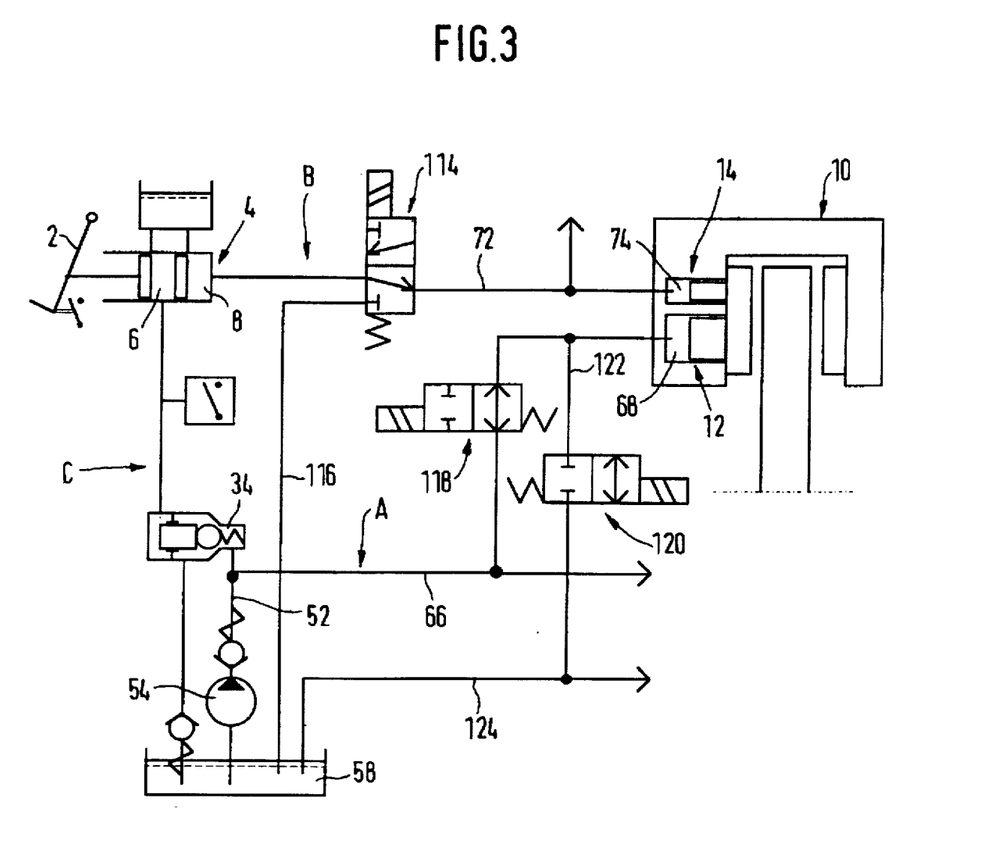
FIG. 3 is a principal illustration of a second embodiment example of the braking system in accordance with the invention, which in contrast to the first embodiment example has additional components for an anti-lock brake system (ABS).

In accordance with the second embodiment example illustrated in FIG. 3, the power-assisted braking system in accordance with FIG. 1 is provided with additional components in order to make an anti-lock brake system (ABS) possible. The parts corresponding to the parts in FIG. 1 are labelled with the same reference numbers and are not re-explained in the following. FIG. 3 illustrates the power-assisted braking device with ABS in its non-actuated mode.

In principle, an anti-lock brake system ensures that if a certain deceleration threshold is exceeded at a braked wheel, the wheel braking pressure is decreased until it falls below a second deceleration threshold at this wheel. It can be necessary to decrease the wheel braking pressure to zero. Then the wheel braking pressure is increased again until either the affected wheel is overbraked again or the braking pressure specified by the driver is achieved.

Therefore, in accordance with FIG. 3, manually-controlled brake circuit B is provided a relief valve 114 (in the illustration, an electro-magnetically actuatable 3/2 directional control valve) that is inserted into the pressure line 72 between the master cylinder 4 and the second piston/cylinder arrangement 14 of the brake caliper 10 and that is connected to the reservoir 58 by a relief line 116. The relief valve 114, occurring only once in the system, connects the pressure chamber 74 of the second piston/cylinder arrangement 14 to the second pressure chamber 8 of the master cylinder 4 or alternatively to the reservoir 58, and is pre-stressed in its position connecting the pressure chamber 74 of the second piston/cylinder arrangement 14 to the second pressure chamber 8 of the master cylinder 4.

Power brake circuit A is provided two on/off valves 118, 120 for each wheel to be controlled (in the illustration, electro-magnetically actuatable 2/2 directional valves with flow-through and block settings). The first on/off valve 118 is inserted into the pressure line 66 to the first piston/cylinder arrangement 12 of the brake caliper 10 and pre-stressed in such a way that in its normal position it connects the pressure line 52 between the hydraulic pump 54 and the pressure chamber 34 of the flow control valve 16 to the pressure chamber 68 of the first piston/cylinder arrangement 12. Branching off between the first on/off valve 118 and the pressure chamber 68 of the first piston/cylinder arrangement 12 is a line 122 that opens into a collective return line 124 connected to the reservoir 58 or that is connected directly to the reservoir 58. The second on/off valve 120 is inserted into the line 122 and is pre-stressed in its closed position.

If braking is introduced through the brake pedal 2 during ABS operation of the hydraulic power-assisted braking system, sensor technology (not shown) recognizes that the braking pressure applied in the brake caliper 10 through power brake circuit A or brake circuit B is locking the braked wheel (not shown). The braking pressure is now adjusted by the electro-magnetic control of the valves 114, 118, and 120 as appropriate. In addition, the relief valve 114 is switched to its position connecting the pressure chamber 74 of the second piston/cylinder arrangement 14 to the reservoir 58 so that the pressure between the second pressure chamber 8 of the master cylinder 4 and the relief valve 114 is locked in while the braking pressure in the pressure chamber 74 of the second piston/cylinder arrangement 14 is decreased to zero by the relief line 116 to the reservoir 58.

In power brake circuit A, the braking pressure in the pressure chamber 68 of the first piston/cylinder arrangement 12 is decreased by switching the on/off valves 118, 120, wherein, by switching the first on/off valve 118 from its flow-through position to its blocked position, the dynamic pressure produced by the hydraulic pump 54 and the flow control valve 16 is blocked compared to the pressure chamber 68 of the first piston/cylinder arrangement 12, while switching the second on/off valve 120 from its blocked position to its flow-through position connects the pressure chamber 68 of the first piston/cylinder arrangement 12 to the reservoir 58. As a result, the braking pressure in the pressure chamber 68 of the first piston/cylinder arrangement 12 to the reservoir 58 is decreased until it drops below the deceleration threshold so that the wheel that was originally locked begins to rotate again. When the wheel that was originally locked begins to rotate again, the electro-magnetic control of the valves 114, 118, and 120 is interrupted so that the valves 114, 118, and 120 each return to their pre-stressed normal position and a braking force that is proportional to the actuating force is applied in the brake caliper 10 by power brake circuit A and brake circuit B as described referring to FIG. 1. A regulating process initiates that continues through the anti-lock braking, whereby no notable regulating pressure surges have a retroactive effect on the brake pedal 2 because of the described structure of the power-assisted braking system with the valves 114, 118, and 120. In particular, produced independent from the switch position of on/off valves 118 and 120 in power brake circuit A is the dynamic pressure, which thereby is reported back unchanged through the control circuit C to the brake pedal 2 so that there is good pedal responsiveness, even during ABS operation of the power-assisted braking system.

Figure 4:
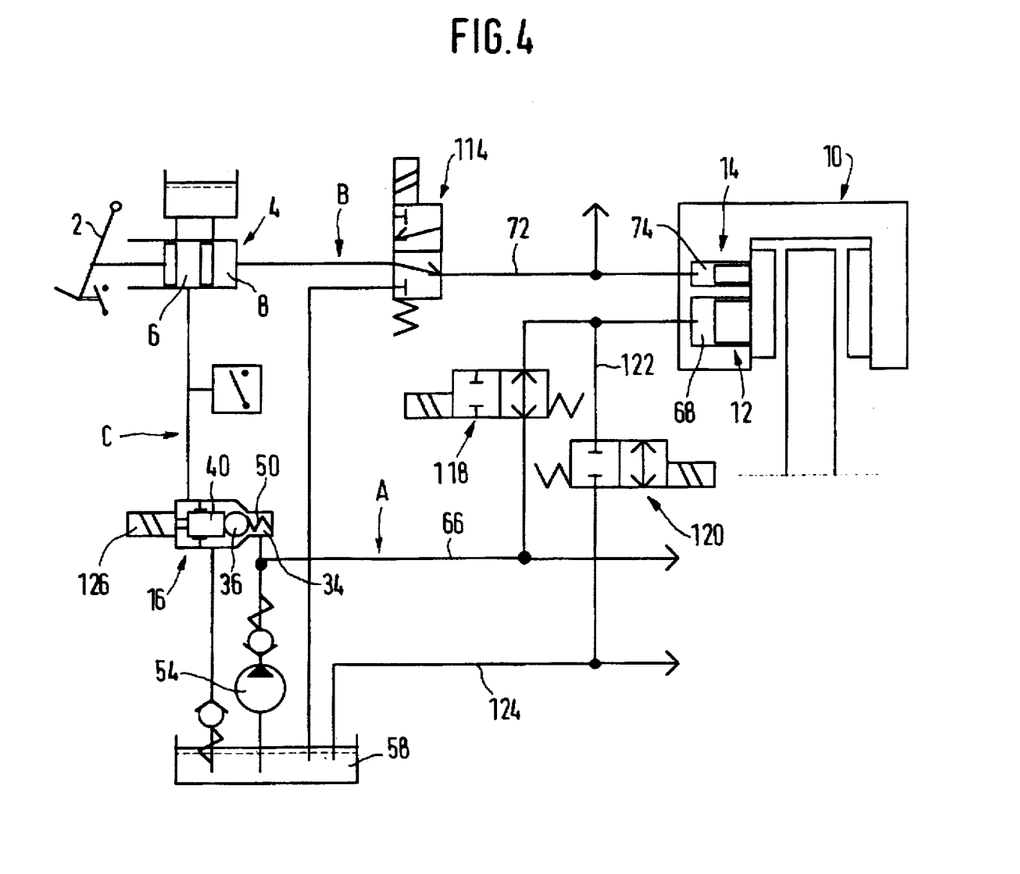
FIG. 4 is a principal illustration of a third embodiment example of the braking system in accordance with the invention, which in contrast to the first and second embodi

In accordance with the third embodiment example illustrated in FIG. 4, the power-assisted braking system per FIG. 1 or FIG. 3 is provided with additional components in order to make possible a traction control system (ASR) and a vehicle dynamics control system. The parts corresponding to the parts in FIGS. 1 and 3 are labelled with the same reference numbers and are not re-explained in the following. FIG. 4 illustrates the power-assisted braking system with ASR and vehicle dynamics control system in its unactuated mode.

Principally, the effect of a traction control system is that when a motor vehicle is being driven, if, for example, the coefficients of friction of a driven wheel to the ground are too low (that is, if an acceleration threshold is exceeded), said wheel is braked until it falls below a second acceleration threshold, so that the wheel is again moving in a reliable traction range. In contrast, in a vehicle dynamics control system, which is principally tailored to maintain the longitudinal stability of the vehicle (which can be measured by the yaw angle between the longitudinal axis of the vehicle and the momentary direction of travel), e.g. braking of one or more wheels is used to correct yawing moments that could lead to the vehicle swerving or skidding in critical driving conditions like, e.g., understeering, oversteering, or braking during rapid travel of a curve.

This means that for such a control system it must be possible to modulate the braking pressure on individual wheels. This is provided using the previously described valves 118 and 120, which are provided for every wheel, as well as an additional electro-magnetic control of the flow control valve 16. To facilitate electro-magnetic control, the flow control valve 16 has an electro-magnet 126 that can be controlled independently from the actuation of the brake pedal 2. The electro-magnet 126 is connected to the control piston 40 of the flow control valve so that the control piston 40 can be moved axially by controlling the electro-magnet 126, for which purpose the electro-magnet 126 is designed as a proportional magnet having the corresponding current/ force characteristic. This means the control piston 40 can be moved by the electro-magnet 126 in a controllable manner depending on force, whereby the valve passage area 48 of the flow control valve 16 decreases when a current is applied to the electro-magnet 126, i.e., when there is greater force. It furthermore means that it enlarges when the current is removed as a result of the force of the pullback spring 50 of the flow control valve 16 as well as the dynamic pressure acting on the valve regulator body 36.

As a result, with the appropriate sensor technology, it is possible to automatically counteract the over-reactions or erroneous reactions that have already been introduced by the driver during operation of the motor vehicle before the driver becomes aware of the critical situation and actuates the brake pedal 2. It is understood that in the braking situation addressed here, in which there is a traction control and vehicle dynamics control system and in which the driver is not an active participant, no pressure builds up in brake circuit B; this is why the relief valve 114 does not have to be controlled and remains in its normal position.

Figure 5:
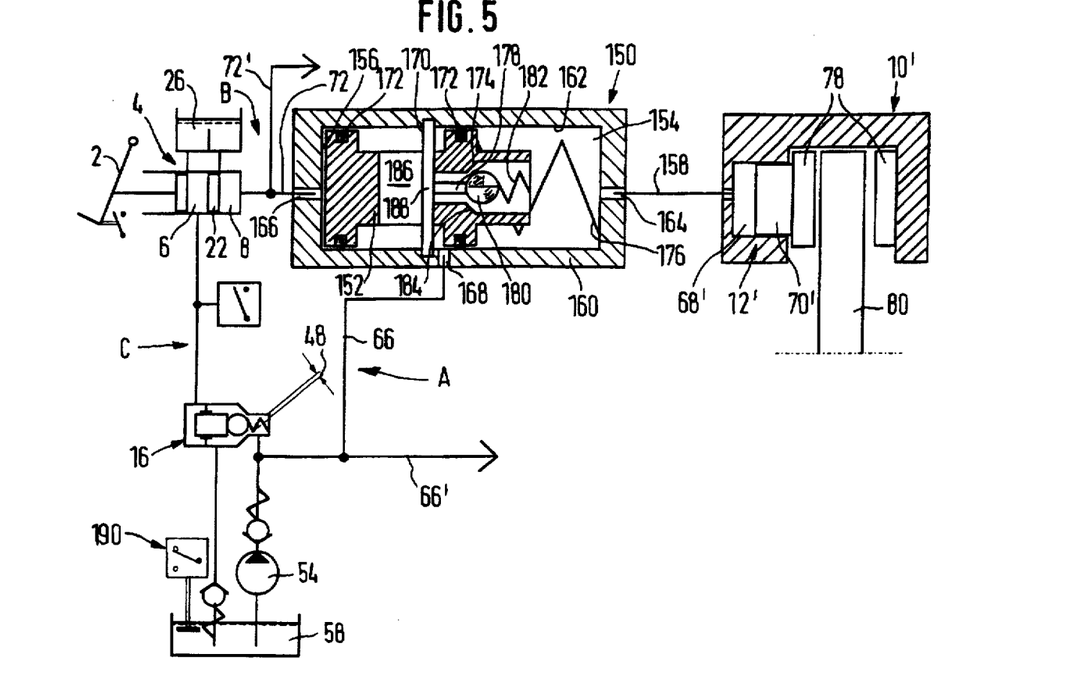
- FIG. 5 is a principal illustration of a fourth embodiment example of the braking system in accordance with the invention, which is designed as a power brake system having a separator piston/cylinder arrangement between a manually-controllable brake circuit and a servo-circuit and also having only one piston/cylinder arrangement in the brake caliper.

In accordance with the fourth embodiment example illustrated in FIG. 5, the braking system is designed as a power braking system. The parts corresponding to the parts in FIG. 1 are labelled with the same reference numbers and are not re-explained in the following. FIG. 5 illustrates the power braking system in its unactuated mode.

The power braking system in accordance with FIG. 5 also has, connected to the brake pedal 2, the master cylinder 4, which has two pressure chambers 6, 8, of which the first pressure chamber 6 hydraulically controls the flow control valve 16 through which flows pressure medium during servo-force braking in order to adjust its regulating cross-section, i.e., its valve passage area 48, to produce a defined dynamic pressure. The control circuit C therefore corresponds to the embodiment examples described in the preceding with respect to structure and function and therefore does not require repeated, more detailed description.

The dynamic pressure produced in the flow control valve 16 applies a braking force to a piston/cylinder arrangement 12', hydraulically connected to the flow control valve 16 during servo-force braking, of a brake application element in the form of a brake caliper 10', which, in contrast to the embodiments described in the preceding, has only a single piston/cylinder arrangement 12'. The brake caliper 10' (a floating caliper in the illustration), like the embodiments described in the preceding, is provided brake linings 78 that are pressed against the brake disk 80 in a known manner when pressure is applied in the pressure chamber 68' of the piston/cylinder arrangement 12' by its piston 70'.

Furthermore, provided between the pressure line 66 of power brake circuit A and the pressure line 72 of brake circuit B is an additional separator piston/cylinder arrangement 150, the separator piston 152 of which hydraulically separates a servo-pressure chamber 154, positioned (in FIG. 5) to the right of the separator piston 152, from an actuating pressure chamber 156, positioned (in FIG. 5) to the left of the separator piston 152. The servo-pressure chamber 154 is hydraulically connected to the piston/cylinder arrangement 12' of the brake caliper 10' by a pressure line 158, while the actuating pressure chamber 156 is attached by the pressure line 72 to the second pressure chamber 8 of the master cylinder 4, so that even if power brake circuit A fails, a braking force for power-assisted braking can be applied to the brake caliper 10' through the pressure in the pressure line 72 of brake circuit B and thereby in the actuating pressure chamber 156 of the separator piston/cylinder arrangement 150 through the separator piston 152; this is described in more detail in the following.

In detail, the separator piston/cylinder arrangement 150 has a preferably cylindrical housing 160 having a cylinder bore 162 that contains the separator piston 152, which can be actuated on two sides and which can move along its longitude. A port 164 for the pressure line 158 leading to the piston/cylinder arrangement 12' is provided at the (in FIG. 5) right-hand face of the housing 160, and at the (in FIG. 5) left-hand face of the housing 160 a port 166 for the pressure line 72 leading to the master cylinder 4 is formed, while a port 168 for the pressure line 66 leading to the flow control valve 16 is provided approximately in the center of the perimeter of the housing 160.

In the axial direction in an approximately a central cross-section, the separator piston 152 has a smaller diameter that, along with the cylinder bore 162 and the cross-sections of the separator piston 152 that have a greater diameter and that are located to either side of the center cross-section, defines an additional pressure chamber 170. The additional pressure chamber 170 is hydraulically separated from the servo-pressure chamber 154 and the actuating pressure chamber 156 (in FIG. 5) to the right and left by means of sealing elements 172 (like O-rings) provided in circumferential grooves in the cross-sections of the separator piston 152 that have a larger diameter.

Furthermore, the separator piston 152 has a central valve 174, known in and of itself, in the braking hydraulics and is pre-stressed into the actuating pressure chamber 156 by means of a restoring spring 176 contained in the servo-pressure chamber 154. The centric central valve 174 has connected to a valve tappet 178 a valve sealing body 180 that is pre-stressed in the direction of the actuating pressure chamber 156 by means of a valve spring 182 against a sealing seat 184 joined to the separator piston 152. Finally, the separator piston 152 is provided a recess 186 that is gripped by a catch 188 attached to the interior circumferential wall of the housing 160.

In the normal position of the separator piston 152 illustrated in FIG. 5, said piston is pre-stressed by the force of the restoring spring 176 against the catch 188. At the same time, the valve tappet 178 is adjacent to the catch 188, whereby the valve sealing body 180 is held at a distance from the sealing seat 184 on the separator piston 152 by the valve tappet 178 against the force of the valve spring 182 so that the central valve 174 is open.

As a result, the additional pressure chamber 170 of the separator piston/cylinder arrangement 150 is hydraulically connected to its servo-pressure chamber 154 by the open central valve 174, so that during operation the servo-pressure in power brake circuit A occurring in the pressure line 66 acts on the piston/cylinder arrangement 12' of the brake caliper 10' through the additional pressure chamber 170 of the separator piston/cylinder arrangement 150, the open central valve 174, the servo-pressure chamber 154, and the pressure line 158, while in brake circuit B the second piston 22 of the master cylinder 4 is hydraulically connected to the separator piston 152 through the second pressure chamber 8 of the master cylinder 4, the pressure line 72, and the actuating pressure chamber 156 of the separator piston/cylinder arrangement 150.

At this point it should be remarked that, for the sake of simplicity, FIG. 5 only illustrates a basic embodiment of the power braking system having a brake caliper 10' for one wheel. Additional brake calipers are connected analogously through the branches 66', 72' from the pressure lines 66, 72, each brake caliper being allocated a separator piston/cylinder arrangement. Likewise, instead of the brake caliper, commensurate with the requirements of the situation, the wheel brake cylinders can also be hydraulically controlled by conventional drum brakes by means of the braking system.

The manner in which the fourth embodiment example functions is described in the following to the extent that it differs from the first embodiment example that was described using FIG. 1 to illustrate. During normal braking (i.e., during servo-force braking), the valve passage area 48 of the flow control valve 16 is adjusted by control circuit C as described and illustrated by FIG. 1 depending on the pressure produced in the first pressure chamber 6 of the master cylinder 4 when the brake pedal 2 is pressed downward. When the hydraulic pump 54 is running, the dynamic pressure produced by forced flow through the valve passage area 48 in the flow control valve 16 is applied through the pressure line 66 of power brake circuit A, the port 168 of the separator piston/cylinder arrangement 150, the additional pressure chamber 170, the open central valve 174, the servo-pressure chamber 154, the port 164, and the pressure line 158 in the piston/cylinder arrangement 12' of the brake caliper 10'.

At essentially the same time or at a slight delay the pressure produced in the second pressure chamber 8 of the master cylinder 4 is applied through the pressure line 72 of brake circuit B and the port 166 of the separator piston/cylinder arrangement 150 in its actuating pressure chamber 156.

The separator piston 152 remains in its normal position at the catch 188, illustrated in FIG. 5, because of the essentially simultaneous pressure actuation of the pressure lines 66, 72, i.e., the subsequent build up in pressure in brake circuit B compared to power brake circuit A. However, this requires that the effective hydraulic surfaces of the separator piston 152 and/or the operating pressure level in control circuit C or brake circuit B compared to power brake circuit A are selected so that the forces affecting the separator piston 152 cancel each other out or the resulting force has an effect in the direction of the actuating pressure chamber 156, smaller differences being compensated by the pre-stressed force of the restoring spring 176. As a result, the braking force is applied to the brake disk 80 solely by the dynamic pressure produced in the flow control valve 16 through the piston/cylinder arrangement 12' of the brake caliper 10', an appropriate response from the dynamic pressure to the brake pedal 2 occurring through the pressure columns of the control circuit C between the flow control valve 16 and the master cylinder 4, this permitting responsive actuation of the brake pedal 2.

If there is no pressure in power brake circuit A in the pressure line 66 as a result of the hydraulic pump 54 failing or as a result of a leak in the separator piston/cylinder arrangement 150 in power brake circuit A or control circuit C, the pressure in the actuating pressure chamber 156 as a result of the brake pedal 2 being depressed pushes the separator piston 152 against the force of the restoring spring 176 out of its normal position away from the catch 188 into the servo-pressure chamber 154. In so doing, the valve tappet 178 is released from the catch 188 so that the valve sealing body 180 is pressed against the sealing seat 184 by the valve spring 182. Accordingly, the central valve 174, now closed, hydraulically separates the additional pressure chamber 170 from the servo-pressure chamber 154. At the same time, as a result of the separator piston 152 being displaced, the required power-assisted braking pressure builds up in the servo-pressure chamber 154 and is applied through the port 164 and the pressure line 158 to the piston/cylinder arrangement 12' of the brake caliper 10' to produce a braking force on the brake disk 80 for power-assisted braking. When the separator piston 152 is pushed further (in FIG. 5) to the right, the separator piston 152 strikes the catch 188 at the end of the recess 186, which limits the power-assisted braking pressure to a maximum value and prevents the central valve 174 from driving onto the bottom of the housing 160.

The reaction force produced during power braking at the piston 70' of the piston/cylinder arrangement 12' of the brake caliper 10' is reported back through the pressure columns between the piston 70' and the separator piston 152 and through the pressure columns between the separator piston 152 and the second piston 22 of the master cylinder 4 to the brake pedal 2 so that even during assisted-power braking there is responsive actuation of the brake pedal 2 that reflects the actual braking pressure the brake caliper 10'.

Figure 6A:
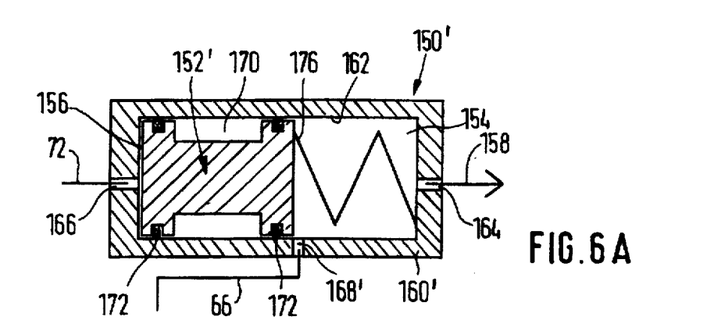
FIG. 6A is a sectional view of a first variant of the separator piston/cylinder arrangement illustrated in FIG. 5.

In accordance with FIG. 5, the reservoir 58 for the pressure medium, separate from the balance tank 26 of the master cylinder 4, is preferably provided with a fill level sensor 190 that is switched with the control of the drive of the hydraulic pump 54, like an electro-motor or an electro-magnetic coupling (not shown). Should there be a failure of mechanical origin (for instance, as a result of the pressure line 66 or the pressure line 158 rupturing), the decrease in the pressure medium in the reservoir 58 caused while the hydraulic pump 54 is operating is detected by the fill lever sensor 190. Depending on a fill level signal produced by the fill level sensor 190, the drive of the hydraulic pump 54 is then turned off in order to prevent the reservoir 58 from being pumped until it is empty. Even given a rupture in the pressure line 158 of the affected brake caliper 10', and especially if the servo-pressure fails as a result of the drive for the hydraulic pump 54 being turned off, power-assisted braking is possible in brake circuit B through the other functional brake application elements (not shown), e.g., the brake calipers or wheel brake cylinders that are connected by the branch 72'. It is useful for brake circuit B and control circuit C to be supplied pressure medium from the reservoir 58 independently through the balance tank 26 provided at the master cylinder 4. FIG. 6A illustrates a first variant 150' of the separator piston/cylinder arrangement 150 described using FIG. 5 as a reference; it can be used instead of the separator piston/cylinder arrangement 150 in accordance with FIG. 5.

The separator piston/cylinder arrangement 150' in accordance with FIG. 6A differs from the separator piston/cylinder arrangement 150 illustrated in FIG. 5 in that no central valve is provided in the separator piston 152', so that the separator piston/cylinder arrangement 150' can be designed to be more cost-effective. The port 168' in the circumferential wall of the housing 160' is attached in such a way that the pressure line 66 is connected hydraulically directly to the servo-pressure chamber 154 when the separator piston 152' is pre-stressed in its normal position by means of the restoring spring 176.

If, as described above, there is an unintentional drop in servo-pressure in the pressure line 66, the pressure occurring in the actuating pressure chamber 156 when the brake pedal 2 is pressed downward pushes the separator piston 152' in FIG. 6A to the right; this causes the sealing element 172 facing the actuating pressure chamber 156 to travel over the port 168' so that the pressure line 66 is connected to the additional pressure chamber 170 at the separator piston 152'. When the separator piston 152' is pushed even further (in FIG. 6A) to the right, a braking pressure for power-assisted braking is built up in the piston/cylinder arrangement 12' of the caliper 10', as described above.

Figure 6B:
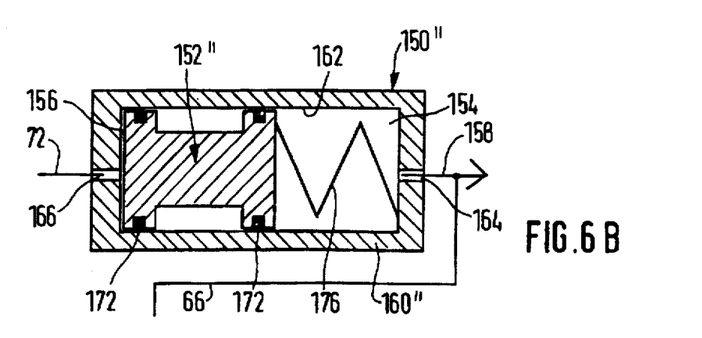
FIG. 6B is a sectional view of a second variant of the separator piston/cylinder arrangement illustrated in FIG. 5.

FIG. 6B illustrates an economical second variant 150" of the separator piston/cylinder arrangement 150 described using FIG. 5 as a reference; it can be used instead of the separator piston/cylinder arrangement 150 or 150' in accordance with FIG. 5. The separator piston/cylinder arrangement 150" in accordance with FIG. 6B does not have a central valve in the separator piston 152" either, and also differs from the separator piston/cylinder arrangement 150' illustrated in FIG. 6A in that the circumferential wall of the housing 160" is not provided with a port for the pressure line 66 and the separator piston 152" can be formed without additional pressure chambers. In this variant, the pressure line 66 is attached directly to the pressure line 158. Since the separator piston/cylinder arrangement 150" therefore cannot separate the pressure line 66 from the pressure line 158, when pressure medium is lost in power brake circuit A there can be no power-assisted braking through the brake caliper 10' allocated to the separator piston/cylinder arrangement 150". On the contrary, power-assisted braking must occur over brake circuit B through the additional functional brake application elements that are connected by branch 72'. If control circuit C fails, or if hydraulic pump 54 in power brake circuit A fails and there is no loss of pressure medium, however, power-assisted braking through the separator piston/cylinder arrangement 150" is possible.

Figure 7:
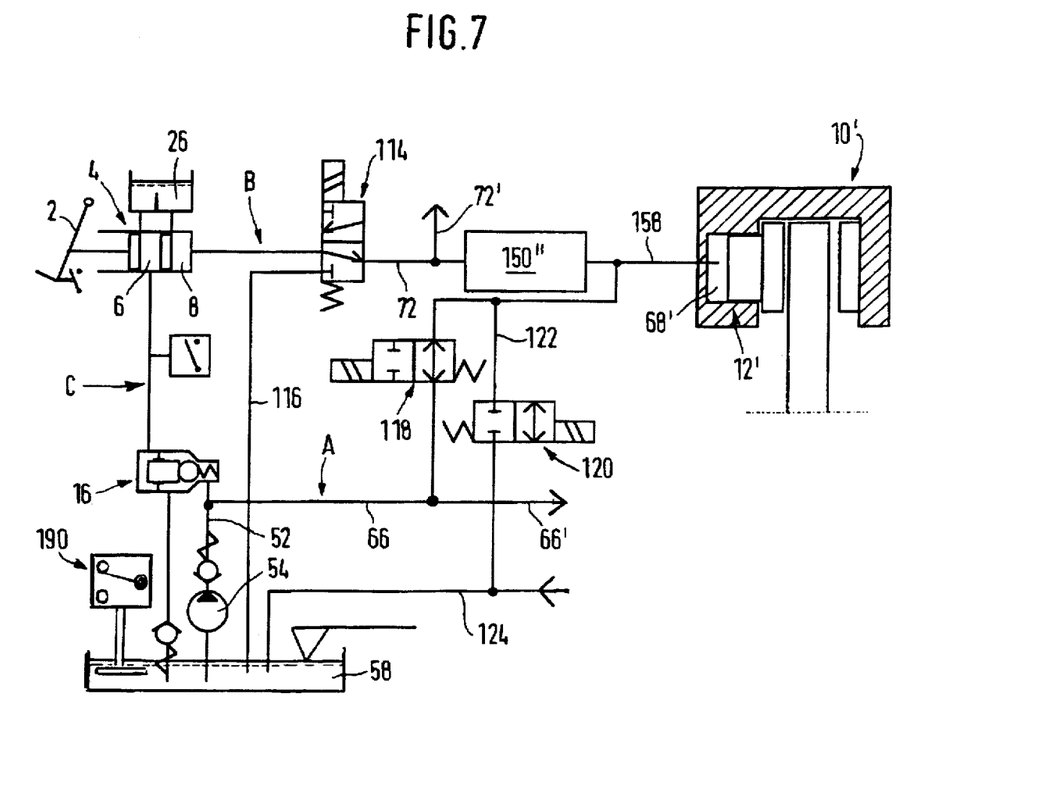
FIG. 7 is a principal illustration of a fifth embodiment example of a braking system in accordance with the invention, which in contrast to the first embodiment example has additional components for an anti-lock brake system (ABS).

In accordance with the fifth embodiment example illustrated in FIG. 7, the power braking system in accordance with FIG. 5 is provided additional components in order to enable an anti-lock brake system (ABS). The parts corresponding to the parts in FIGS. 1, 3, and 5 are labelled with the same reference numbers and are not re-explained in the following. FIG. 7 illustrates the power braking system with ABS in its unactuated mode.

Like the second embodiment example, in accordance with FIG. 7 the fifth embodiment example is provided a relief valve 114 in brake circuit B which is inserted into the pressure line 72 between the master cylinder 4 and the separator piston/cylinder arrangement 150" and which is connected by a relief line 116 to the reservoir 58. Here again there is a total of only one relief valve 114 in the braking system. The relief valve 114 connects the actuating pressure chamber 156 of the separator piston/cylinder arrangement 15" to the second pressure chamber 8 of the master cylinder 4 or alternatively to the reservoir 58, it being pre-stressed in the position that connects the actuating pressure chamber 156 of the separator piston/cylinder arrangement 150" to the second pressure chamber 8 of the master cylinder 4.

Power brake circuit A is furthermore provided with two on/off valves 118, 120 for each wheel to be controlled, as in the second embodiment example. The first on/off valve 118 is inserted into the pressure line 66 to the piston/cylinder arrangement 12' of the brake caliper 10' and is pre-stressed in such a way that in its normal position it connects the pressure line 52 between the hydraulic pump 54 and the flow control valve 16 to the pressure line 158 between the separator piston/cylinder arrangement 150" and the piston/cylinder arrangement 12' of the brake caliper 10'. Branching off between the first on/off valve 118 and the pressure line 158 is a line 122 that opens into a collective return line 124 connected to the reservoir 58. The second on/off valve 120 is inserted into the line 122 and is pre-stressed in its closed position.

During ABS operations, if a braking force is introduced into the braking system through the brake pedal 2, sensing technology (not shown) detects that braking pressure applied through power brake circuit A or brake circuit B in the brake caliper 10' is causing the braked wheel (not shown) to lock. The braking pressure is now appropriately adjusted by electro-magnetic control of the valves 114, 118, and 120. In addition, the relief valve 114 is switched to its position connecting the actuating pressure chamber 156 of the separator piston/cylinder arrangement 150" to the reservoir 58, so that the pressure occurring between the second pressure chamber 8 of the master cylinder 4 and the relief valve 114 is locked in, while the pressure in the actuating pressure chamber 156 is decreased to zero by the relief line 116 to the reservoir 58 so that the separator piston 152" is held in its normal position.

In power brake circuit A, the braking pressure in the pressure chamber 68' of the piston/cylinder arrangement 12' of the brake caliper 10' is reduced by switching the on/off valves 118, 120. In doing so, the dynamic pressure produced by means of the hydraulic pump 54 and the flow control valve 16 is blocked by switching the first on/off valve 118 from its flow-through position to its blocked position with respect to the pressure chamber 68' of the piston/cylinder arrangement 12', while the pressure chamber 68' is connected to the reservoir 58 by switching the second on/off valve 120 from its blocked position to its flow-through position. As a result, the braking pressure in the pressure chamber 68' decreases until it falls below the deceleration threshold, at which point the wheel that was originally locked begins to rotate again.

When the wheel that was originally locked begins to rotate again, the valves 114, 118, and 120 are no longer controlled electro-magnetically, so that they each return to their pre-stressed normal position and a braking force that is proportional to the actuating force is applied in the brake caliper 10' by power brake circuit A as described referring to FIG. 5.

A regulating process initiates that continues through the anti-lock braking. The described structure of the braking system with the valves 114, 118, and 120 prevents detectable regulating pressure surges from retroactively affecting the brake pedal 2. In particular, independent of the switch position of the on/off valves 118 and 120, the dynamic pressure is produced in power brake circuit A that is reported back unchanged through the control circuit C to the brake pedal 2 so that there is good pedal responsiveness, even during ABS operation of the braking system.

In the selected circuit arrangement, in accordance with which each brake application element is allocated a separator piston/cylinder arrangement 150", each individual brake application element is protected, regardless of the distribution of braking pressure, so that if said brake application element fails, the remaining brake application elements remain fully functional. If the hydraulic pump 54 fails, power-assisted braking is effected through brake circuit B, as described previously referring to FIG. 5.

Should there be a leak between the on/off valve 118 and the actuating pressure chamber 156 of the separator piston/cylinder arrangement 150" or piston/cylinder arrangement 12' of the brake caliper 10', after the fill level sensor 190 detects a decrease in the pressure medium in the reservoir 58, the hydraulic pump 54 does not have to be adjusted if movement by the separator piston 152" of the separator piston/cylinder arrangements 150" can be detected by means of an activating contact or sensor (not shown). Namely, if there is such a leak, the pressure in the servo-pressure chamber 154 of the separator piston/cylinder arrangement 150" of the affected brake circuit is decreased, which results in the affected separator piston 152" being displaced because of the pressure in the actuating pressure chamber 156. After sensing that the affected separating piston 152" has moved, the allocated on/off valve 118 merely needs to be switched to its blocked position so that the other brake circuit connected by branch 66' can continue to be supplied pressure produced by the hydraulic pump 54 and the flow control valve 16.

At this point it should be remarked that the braking system shown in FIG. 7 does have variant 150" of the separator piston/cylinder arrangement illustrated in FIG. 6B; however, the separator piston/cylinder arrangement 150 or 150' illustrated in FIGS. 5 and 6A, respectively, could also be used.

Figure 8:
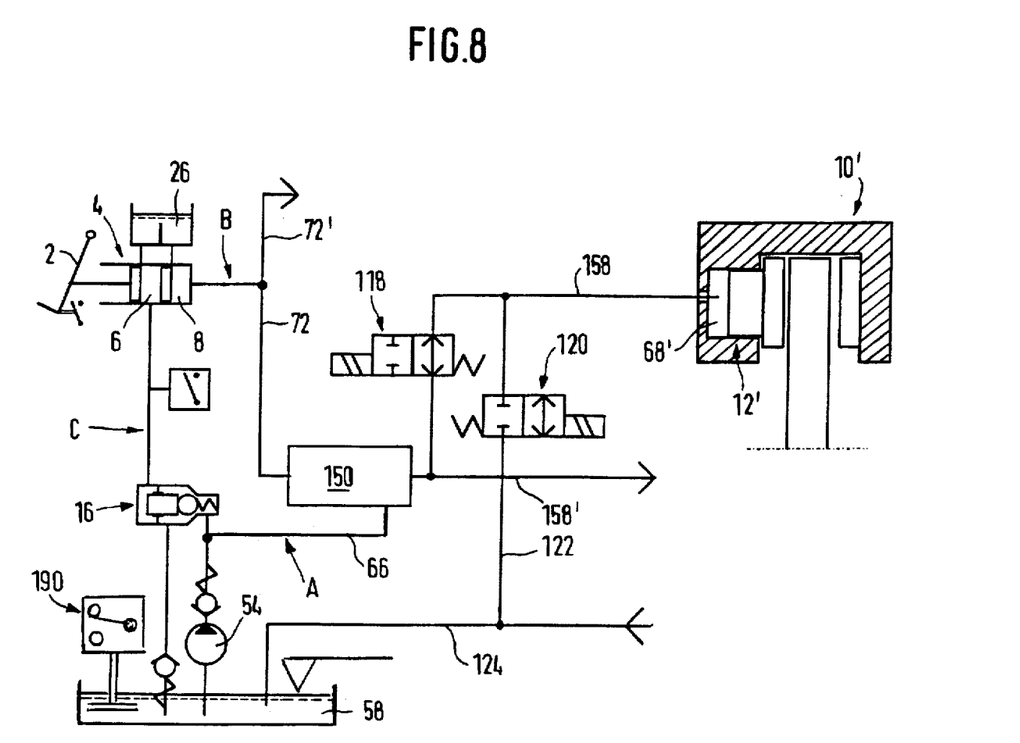
FIG. 8 is a principal illustration of a first variant of the fifth embodiment example.

In the first variant of the fifth embodiment example, illustrated in FIG. 8, only those features that differ from the fifth embodiment example will be described in the following. Several brake application elements 10' (for example, of an axle circuit or a diagonal circuit) are connected by the pressure line 158 or its branch 158' to a separator piston/cylinder arrangement 150 in order to jointly protect the corresponding brake application elements 10' from servo-pressure failure. Here, again, the variants 150' or 150" can be used instead of the separator piston/cylinder arrangement 150.

Furthermore, for every brake application element 10', two on/off valves 118, 120 are provided; of these, the on/off valve 118 is inserted into the pressure line 158 between the servo-pressure chamber 154 of the separator piston/cylinder arrangement 150 and the pressure chamber 68' of the piston/cylinder arrangement 12' of the brake application element 10'—in other words, behind the separator piston/cylinder arrangement 150 (as seen from the flow control valve 16 or the hydraulic pump 54). This means that the relief valve provided in accordance with FIG. 7 can be omitted because the separator piston 152 of the separator piston/cylinder arrangement 150 is actuated by the pressure produced in the flow control valve 16, even during anti-locking control, and is therefore held in its normal position.

Figure 9:
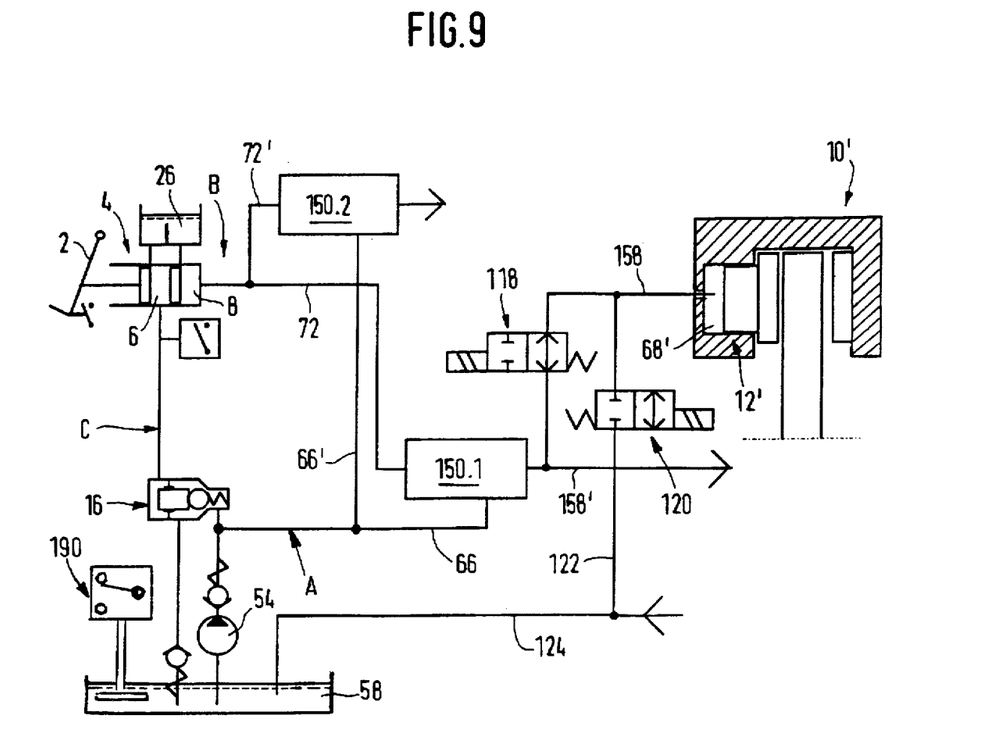
FIG. 9 is a principal illustration of a second variant of the fifth embodiment example.

FIG. 9 shows a second variant of the fifth embodiment example that will only be described in the following in terms of its features that differ from the first variant of the fifth embodiment example in accordance with FIG. 8. In accordance with FIG. 9, in addition to the separator piston/cylinder arrangement 150.1, a second separator piston/cylinder arrangement 150.2 is inserted parallel to it so that the brake application elements 10' of each circuit, e.g., each axle or diagonal circuit, are each jointly protected from servo-pressure failure. The second separator piston/cylinder arrangement 150.2 is attached with its actuating pressure chamber 156 to the branch 72' of the pressure line 72, while the servo-pressure chamber 154 of the second separator piston/cylinder arrangement 150.2 is hydraulically connected by the branch 66' to the pressure line 66.

One skilled in the art will recognize that the circuit variants of the braking system in accordance with FIGS. 1, 3, 5, and 7 through 9 can be combined as appropriate, depending on the number of wheels to be braked, the type of brake application elements provided for the wheels, safety issues, and controls desired, whereby electro-magnetic control of the flow control valve 16 (electro-magnet 126) for a traction control system or vehicle dynamics control system, as described referring to FIG. 4, can also be provided in the circuit variants of FIGS. 5 and 7 through 9.

A braking system is disclosed that has a manually-actuatable master cylinder having two pressure chambers. The first pressure chamber hydraulically controls a flow control valve through which flows the pressure medium in servo-force braking in order to adjust its regulating cross-section to produce a defined dynamic pressure that is applied to a first piston/cylinder arrangement of a brake application element that is connected to a flow control valve to produce a braking force. The second pressure chamber can be connected to a second position/cylinder arrangement of the brake application element so that a braking force can be applied if the servo-force fails. Also, instead of the second piston/cylinder arrangement, a separate separator piston/cylinder arrangement can be provided that is inserted between the second pressure chamber and the piston/cylinder arrangement. Then sufficient braking force is produced both in servo-force braking and if the servo-force fails, and an appropriate response by the braking forces to the master cylinder is effected so that there is always good actuating responsiveness.

Although the present invention has been described with reference to specific embodiments, those of skill in the an will recognize that changes may be made thereto without departing from the scope and spirit of the invention as set forth in the appended claims.

I claim:

1. A hydraulic braking system, especially for motor vehicles, comprising:

an actuating device;

a master cylinder connected to said actuating device, said master cylinder including a first pressure chamber and a second pressure chamber;

a flow control valve having a regulating cross-section, through which flows a pressure medium during servo-force braking, hydraulically connected to said first pressure chamber so that said first pressure chamber hydraulically controls said flow control valve by adjusting the regulating cross-section to produce a defined dynamic pressure; and a brake application element constructed and arranged to produce a braking force, said brake application element including a first piston/cylinder arrangement and a second piston/cylinder arrangement, said first piston/cylinder arrangement being hydraulically connected to said flow control valve and being responsive to said defined dynamic pressure received from said flow control valve, said second piston/cylinder arrangement being hydraulically connected to said second pressure chamber to produce a braking force via the brake application element if said servo-force braking fails.

2. A braking system in accordance with claim 1, wherein said first piston/cylinder arrangement and said second piston/cylinder arrangement of said brake application element have respective central axes which are arranged concentric to each other, said braking system further comprising:

a housing of the brake application element having an annular chamber;

a slidable annular piston arranged within said annular chamber thereby forming a first pressure chamber of said first piston/cylinder arrangement; and a pivot of said housing concentrically enclosed by said annular chamber, said pivot together with said slidable annular piston defining a cylindrical chamber thereby forming a pressure chamber of said second piston/cylinder arrangement.

3. A braking system in accordance with claim 1, further comprising:

a relief valve positioned between said second pressure chamber of said main cylinder and said second piston/cylinder arrangement of said brake application element, said relief valve alternatively connecting said second piston/cylinder arrangement to said second pressure chamber or to a reservoir; and a first on/off valve and a second on/off valve arranged between said flow control valve and said first piston/cylinder arrangement of the brake application element in a section that can be actuated by said dynamic pressure, said first on/off valve interrupting the connection between said flow control valve and said first piston/cylinder arrangement, as selected, and said second on/off valve alternatively connecting said first piston/cylinder arrangement to said reservoir.

4. A braking system in accordance with claim 1, wherein said flow control valve comprises:

a ball check valve including a spherical valve regulator body and an annular sealing seat; and a valve passage area located between said spherical valve regulator body and said annular sealing seat, said pressure medium flowing through said valve passage area when said dynamic pressure is produced, said ball check valve regulating said cross-section of said flow control valve by adjustably enlarging or decreasing said valve passage area.

5. A braking system in accordance with claim 1, wherein said flow control valve further comprises:

an electromagnet constructed and arranged to adjust said cross-section of said flow control valve independent of said actuating device.

* * * * *